Figure 1:
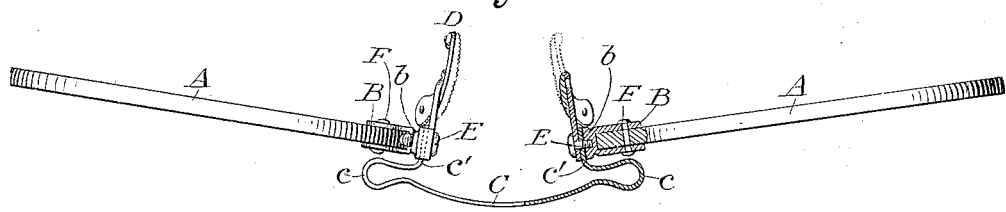
Figure 2:
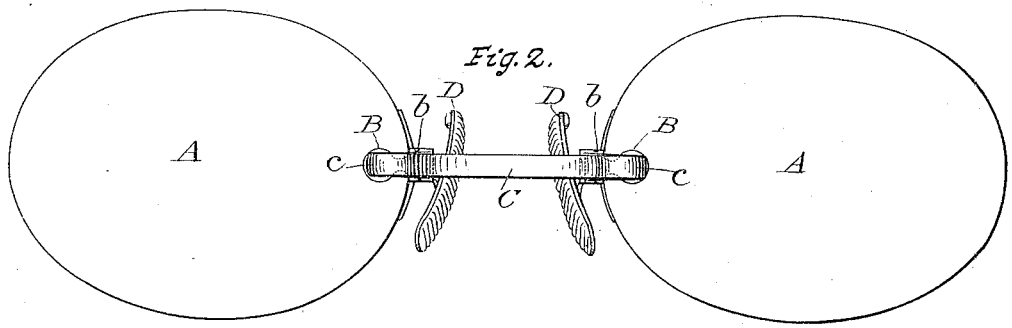

No. 656,709. Patented Aug. 28, 1900.
L. F. ADT.
EYEGLASSES.
(Application filed Mar. 10, 1900.)
(No Model.)

Witnesses
Charles Surick.
William A. Treadwell.

Leo F. Adt
Inventor,
by
R. W. Hardie
Attorney

UNITED STATES PATENT OFFICE.

LEO F. ADT, OF TROY, NEW YORK.

EYEGLASSES.

SPECIFICATION forming part of Letters Patent No. 656,709, dated August 28, 1900.

Application filed March 10, 1900. Serial No. 8,145. (No model.)

*To all whom it may concern:*

Be it known that I, LEO F. ADT, a citizen of the United States, residing at Troy, in the county of Rensselaer and State of New York, have invented certain new and useful Improvements in Eyeglasses; and I do hereby declare the following to be a full, clear, and exact description of the invention, such as will enable others skilled in the art to which it appertains to make and use the name.

My invention relates to eyeglasses, and particularly to the construction and arrangement of the bow-spring connected with the lenses, and has for its object to provide means adapted to readily secure and maintain such lenses in proper position.

My device is designed to be applied to eyeglasses generally, but especially to cylindrical glasses adapted to correct the defects of astigmatism. Great difficulty has heretofore been experienced in using cylindrical lenses in the form of eyeglasses, for the reason that it has been found almost if not quite impractical to maintain the axis of such lenses in proper adjustment to the eye. Such difficulties arise from the fact that the bow-spring ordinarily used in eyeglasses because of its construction and arrangement relatively to the lenses permits the axial line of one lens to be above or below or inclined to that of the opposite lens, and such construction also permits of a torsional movement of the lenses, which draws one lens out of and away from the plane of the opposite lens. To overcome such difficulties, I have constructed a bow-spring having its main portion curved but slightly, so as to avoid any torsional movement in the bow-spring, and have arranged such spring so that its resilient portion lies in a plane perpendicular to the plane of the lenses, thereby keeping the axis of both lenses in the same line. I have provided the desired flexibility to such bow-spring by forming its ends in the shape of loops which extend over in front of the inner ends of the lenses and permit the desired flexibility and yet maintain the glasses in the proper position.

As illustrated in the drawing, the lenses A are secured to clasps B, having studs or posts $b$, to which the nose-guards D and the ends of the bow-spring C are secured by means of stud-screws E. The bow-spring C is arranged in a horizontal plane and is made of spring metal, so as to have resilient movement in such plane. The ends of the bow-spring C are bent over to form loops $c$, which extend over and in front of the inner ends of the lenses, and thereby provide increased spring tension without torsional movement, and the extreme ends $c'$ of the bow-spring C are preferably offset and secured to the posts $b$ of the lens-clasps B. The bow-spring C when not adjusted to the wearer extends in a slightly-curved line, as shown in the drawing, and when the ends of such spring are bent outward, as when adjusted to the wearer, the main portion or body of such bow-spring serves as a brace to prevent torsional movement of said bow-spring and resists any displacement of one lens relatively to the other and confines the movement of said lenses to a horizontal plane or a plane perpendicular to the plane of the lenses. By such means a bow-spring is provided having the desired resilience and firmness.

What I claim is—

In eyeglasses, the combination with the lenses, of nose-guards, and a bow-spring provided with loop ends and a central portion arranged in front of the plane of said lenses, and extending horizontally, said loop ends extending beyond the inner ends of said lenses, substantially as shown and described.

In testimony whereof I affix my signature in presence of two witnesses.

LEO F. ADT.

Witnesses:
ROBERT W. HARDIE,
GEORGE B. YOUNG.